(12) United States Patent
Sibbach et al.

(10) Patent No.: US 12,221,905 B1
(45) Date of Patent: Feb. 11, 2025

(54) TURBINE ENGINE INCLUDING A STEAM SYSTEM

(71) Applicant: General Electric Company, Schenectady, NY (US)

(72) Inventors: Arthur W. Sibbach, Boxford, MA (US); Robert R. Rachedi, Morrow, OH (US); Brandon W. Miller, Middletown, OH (US); Jeffrey D. Rambo, Mason, OH (US); Daniel A. Niergarth, Norwood, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/366,256

(22) Filed: Aug. 7, 2023

(51) Int. Cl.
*F01K 21/04* (2006.01)
*F01K 7/16* (2006.01)
*F02C 6/00* (2006.01)

(52) U.S. Cl.
CPC .............. *F01K 21/047* (2013.01); *F01K 7/16* (2013.01); *F02C 6/00* (2013.01); *F05D 2220/72* (2013.01); *F05D 2240/35* (2013.01)

(58) Field of Classification Search
CPC .... F02C 3/305; F02C 1/06; F02C 1/08; F01K 23/10
See application file for complete search history.

(56) References Cited

U.S. PATENT DOCUMENTS

| | | |
|---|---|---|
| 5,896,740 A | 4/1999 | Shouman |
| 6,983,605 B1 | 1/2006 | Hook et al. |
| 8,151,549 B2 | 4/2012 | Sasaki et al. |

(Continued)

FOREIGN PATENT DOCUMENTS

| | | |
|---|---|---|
| FR | 3127269 A1 | 3/2023 |
| FR | 3130896 A1 | 6/2023 |

(Continued)

OTHER PUBLICATIONS

Bjorn Fehrm, Leeham News and Analysis, "MTU gets support from Pratt & Whitney to develop the WET engine," published Nov. 29, 2022, available at https://leehamnews.com/2022/11/29/mtu-gets-support-from-pratt-whitney-to-develop-the-wet-engine/, as viewed on Jun. 30, 2023.

(Continued)

*Primary Examiner* — Thuyhang N Nguyen
(74) *Attorney, Agent, or Firm* — Venable LLP; Peter T. Hrubiec; Michele V. Frank

(57) ABSTRACT

A turbine engine for an aircraft. The turbine engine includes a fan, a combustor in a core air flowpath that generates combustion gases, a core shaft, a turbine that receives the combustion gases to rotate the turbine, and a steam system. The steam system extracts water from the combustion gases, vaporizes the water to generate steam, and injects the steam into the core air flowpath. The steam system includes one or more water storage devices that store the water therein. The (Continued)

one or more water storage devices include a first state in which the one or more water storage devices increase or maintain a level of the water as the water flows through the one or more water storage devices, and a second state in which the one or more water storage devices decrease the level of the water in the one or more water storage devices.

20 Claims, 3 Drawing Sheets

(56) References Cited

U.S. PATENT DOCUMENTS

| | | | |
|---|---|---|---|
| 8,631,656 B2 | 1/2014 | Danis et al. | |
| 8,826,671 B2 | 9/2014 | Kim et al. | |
| 8,950,191 B2 * | 2/2015 | Landis | F02C 7/143 |
| | | | 60/773 |
| 9,464,573 B2 | 10/2016 | Remy et al. | |
| 10,041,417 B2 | 8/2018 | Horikawa et al. | |
| 11,603,798 B1 * | 3/2023 | Terwilliger | F02C 7/18 |
| 11,808,209 B1 * | 11/2023 | Sobanski | F02C 6/18 |
| 11,920,515 B2 * | 3/2024 | Alahyari | F02C 7/141 |
| 2008/0110417 A1 * | 5/2008 | Smith | B01D 1/0058 |
| | | | 122/379 |
| 2017/0356663 A1 * | 12/2017 | Couperthwaite | F28F 13/06 |
| 2023/0286661 A1 * | 9/2023 | Klingels | B64D 29/06 |
| 2023/0407768 A1 * | 12/2023 | Staubach | F02K 3/06 |

FOREIGN PATENT DOCUMENTS

| | | |
|---|---|---|
| FR | 3130897 A1 | 6/2023 |
| FR | 3133367 A1 | 9/2023 |
| FR | 3133368 A1 | 9/2023 |
| JP | H08232680 A | 9/1996 |

OTHER PUBLICATIONS

MTU Aero Engines, "Water-enhanced turbofan," available at https://www.mtu.de/technologies/clean-air-engine/water-enhanced-turbofan/, as viewed on Jun. 30, 2023.

Isabel Henrich, MTU Aero Engines, "A brief guide: How the WET concept works," published Jun. 2022, available at https://aeroreport.de/en/good-to-know/a-brief-guide-how-the-wet-concept-works, as viewed on Jun. 30, 2023.

Slides from Sustainable Water-Injecting Turbofan Comprising Hybrid-Electrics (SWITCH) Introduction at the 2023 NPSS Annual Consortium Meeting, Mar. 10, 2023.

* cited by examiner

TURBINE ENGINE INCLUDING A STEAM SYSTEM

TECHNICAL FIELD

The present disclosure relates generally to turbine engines including a steam system.

BACKGROUND

Turbine engines used in aircraft generally include a fan and a core section arranged in flow communication with one another. A combustor is arranged in the core section to generate combustion gases for driving a turbine in the core section of the turbine engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
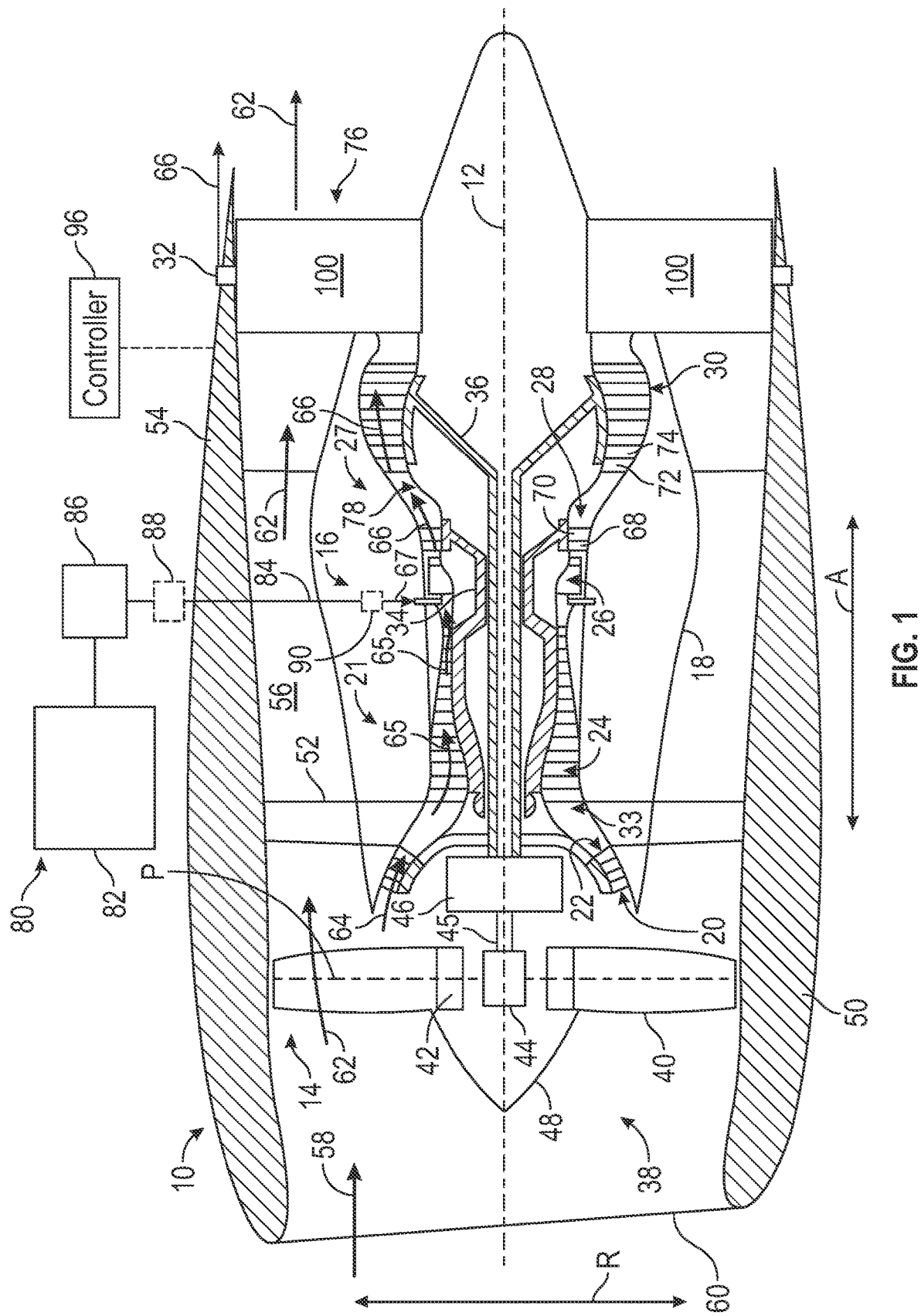
FIG. 1 is a schematic cross-sectional diagram of a turbine engine including a steam system, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," and "fourth" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle, and refer to the normal operational attitude of the turbine engine or the vehicle. For example, with regard to a turbine engine, forward refers to a position closer to an engine inlet and aft refers to a position closer to an engine nozzle or an exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, "steady state" operating conditions of a turbine engine are operating conditions of the turbine engine in which a level of the operating conditions is substantially constant (e.g., not increasing or decreasing). Steady state operating conditions typically occur when the turbine engine is operating at idle conditions, takeoff conditions, or cruise conditions. During steady state operating conditions, a throttle position for the turbine engine remains stable or unchanged.

As used herein, "transient operating conditions" of the turbine engine are operating conditions in which a level of the operating conditions is increasing or decreasing. Transient operating conditions typically occur when the turbine engine is accelerating or decelerating between the idle conditions, the takeoff conditions, or the cruise conditions. The transient operating conditions are typically in response to a change of the throttle position for the turbine engine.

As used herein, a "bypass ratio" of a turbine engine is a ratio of bypass air through a bypass of the turbine engine to core air through a core inlet of a core turbine engine of the turbine engine. For example, the bypass ratio is a ratio of bypass air 62 entering the bypass airflow passage 56 to core air 64 entering the core turbine engine 16.

As used herein, a "compression ratio" of a compressor is a ratio of a compressor exit pressure at an exit of the compressor to a compressor inlet pressure at an inlet of the compressor. The compressor exit pressure and the compressor inlet pressure are measured as static air pressures perpendicular to the direction of the core air flow through the compressor.

As used herein, a "pressure expansion ratio" of a turbine is a ratio of a pressure at an inlet of the turbine to a pressure at an exit of the turbine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

As noted above, a combustor is arranged in the core section to generate combustion gases for driving a turbine in the core section of the turbine engine. Not all of the energy and heat generated by the combustor is used to drive the turbine(s) of the turbine section. Instead, some of the waste heat is exhausted through a jet exhaust nozzle section in a conventional turbine engine. A steam system is used to recover some of the energy from the waste heat by generating steam and driving a steam turbine. The steam is injected into the core engine (e.g., into, upstream of, or downstream of, the combustor). The steam turbine inputs additional work into the core engine and the steam that is injected into the core engine increases a mass flow through the core engine. In this way, less air is needed through the core engine and a size of the core engine is decreased as compared to turbine engines without the benefit of the present disclosure. The core engine includes a high-pressure turbine (HPT) having only a single stage of HPT stator vanes and HPT rotor blades that drives a high-pressure compressor (HPC) having a plurality of stages (e.g., ten to twelve stages) of HPC stator vanes and HPC rotor blades. Decreasing the size of the core engine allows the bypass ratio to increase for a particular fan size as compared to turbine engines without the benefit of the present disclosure. Thus, the present disclosure provides for a bypass ratio that is greater than 18:1, preferably, in a range of 18:1 to 100:1. The HPC has a compression ratio that is greater than 20:1, preferably, in a range of 20:1 to 40:1.

The injection of steam into the core turbine engine increases the mass flow through the turbine section, enabling the only single stage HPT to drive the HPC with a compression ratio greater than 20:1. The steam injection into the core turbine engine, in combination with the compression ratio being greater than 20:1, enables the increased bypass ratio and thermal efficiency of the turbine engine, as well as a more efficient thermal cycle of the turbine engine, as compared to turbine engines without the benefit of the present disclosure. Accordingly, the steam system enables the size of the core turbine engine to be reduced, while maintaining a constant fan size, thereby increasing the bypass ratio, as compared to ducted fan turbine engines without the benefit of the present disclosure.

During steady state operating conditions of the turbine engine, the steam system extracts enough water from the combustion gases to produce a necessary amount of steam for operating the core turbine engine and the steam turbine. During transient operating conditions of the turbine engine, however, the steam system may not be able to extract enough water to produce enough steam for operating the core turbine engine and the steam turbine. Further, the steam system may not be able to extract enough water to produce enough steam for operating the core turbine engine and the steam turbine during startup operating conditions while the turbine engine is starting up before the steady state operating conditions have been achieved.

Accordingly, the present disclosure provides for a steam system having a water storage device that stores water therein. The water that the steam system extracts flows into the water storage device. The water then flows from the water storage device to a boiler that vaporizes the water to generate the steam. The water storage device is an accumulator that ensures a continuous supply of water to the boiler during operation of the turbine engine. The water storage device includes an overflow drain that drains excess water into an exhaust or a drain port. Such a configuration helps to maintain a level of the water in the water storage device. Thus, during steady state operating conditions of the turbine engine, when the steam system produces enough steam, the water fills the water storage device and is maintained within the water storage device. The excess water drains through the overflow drain. During transient operating conditions of the turbine engine or during startup operating conditions of the turbine engine, when the steam system is not producing enough steam, the water that is stored within the water storage device is supplied from the water storage device to the boiler such that level of the water in the water storage device decreases.

The water storage device and other components of the steam system include drain valves to drain the water when the turbine engine is shut down to prevent the water from freezing in the steam system when the turbine engine is shut down and the ambient temperature is less than freezing. The drain valves can be opened automatically when the turbine engine controller de-energizes and can be closed when the controller energizes. In some embodiments, the controller controls the drain valves to open and to close.

Accordingly, the steam system detailed herein provides for supplying the water to the boiler even during transient operating conditions when the steam system may not be able to extract enough water to generate the operating level of the steam. In this way, the steam system produces the operating level of the steam during all operating conditions of the turbine engine, i.e., during both steady state operating conditions and transient operating conditions. The water storage device also helps to prevent cavitation or damage to the water pump by ensuring water is supplied to the water pump during the transient operating conditions or during startup operating conditions of the turbine engine.

The drain valves ensure the water in the steam system does not freeze when the turbine engine is shut down. Further, the additional work that is extracted by the steam system and the steam through the steam turbine and injected into the core engine enables the turbine engine to have a bypass ratio greater than 18:1 (e.g., preferably, in a range of 18:1 to 100:1), enables the HPT to have only one stage, and enables the HPC to have a compression ratio greater than 20:1 (e.g., preferably, in a range of 20:1 to 40:1).

Referring now to the drawings, FIG. 1 is a schematic cross-sectional diagram of a turbine engine 10 including a steam system 100, taken along a longitudinal centerline axis 12 (provided for reference) of the turbine engine 10, according to an embodiment of the present disclosure. As shown in FIG. 1, the turbine engine 10 has an axial direction A (extending parallel to the longitudinal centerline axis 12) and a radial direction R that is normal to the axial direction A. In general, the turbine engine 10 includes a fan section 14 and a core turbine engine 16 disposed downstream from the fan section 14.

The core turbine engine 16 includes an outer casing 18 that is substantially tubular and defines a core inlet 20. As schematically shown in FIG. 1, the outer casing 18 encases, in serial flow relationship, a compressor section 21 including a booster or a low-pressure compressor (LPC) 22 followed downstream by a high-pressure compressor (HPC) 24, a combustor 26, a turbine section 27, including a high-pressure turbine (HPT) 28, followed downstream by a low-pressure turbine (LPT) 30, and one or more core exhaust nozzles 32. A high-pressure (HP) shaft 34 or a spool drivingly connects the HPT 28 to the HPC 24 to rotate the HPT 28 and the HPC 24 in unison. A low-pressure (LP) shaft 36 drivingly connects the LPT 30 to the LPC 22 to rotate the LPT 30 and the LPC 22 in unison. The compressor section 21, the combustor 26, the turbine section 27, and the one or more core exhaust nozzles 32 together define a core air flowpath 33.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuator 44 configured to collectively vary the pitch of the fan blades 40 in unison. The fan blades 40, the disk 42, and the actuator 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween. The one or more core exhaust nozzles 32 may extend through the nacelle 50 and be formed therein. In this embodiment, the one or more core exhaust nozzles 32 include one or more discrete nozzles that are spaced circumferentially about the nacelle 50. Other arrangements of the core exhaust nozzles 32 may be used including, for example, a single core exhaust nozzle that is annular, or partially annular, about the nacelle 50.

During operation of the turbine engine 10, a volume of air 58 enters the turbine engine 10 through an inlet 60 of the nacelle 50 or the fan section 14. As the volume of air 58 passes across the fan blades 40, a first portion of air (bypass air 62) is directed or routed into the bypass airflow passage 56, and a second portion of air (core air 64) is directed or is routed into the upstream section of the core air flowpath 33, or, more specifically, into the core inlet 20 of the LPC 22. The ratio between the bypass air 62 and the core air 64 is known as a bypass ratio. In some embodiments, the bypass ratio is greater than 18:1, enabled by a steam system 100, detailed further below. The pressure of the core air 64 is then increased by the LPC 22, generating compressed air 65, and the compressed air 65 is routed through the HPC 24 and further compressed before being directed into the combustor 26, where the compressed air 65 is mixed with fuel 67 and burned to generate combustion gases 66 (combustion products). One or more stages may be used in each of the LPC 22 and the HPC 24, with each subsequent stage further compressing the compressed air 65. The HPC 24 has a compression ratio greater than 20:1, preferably, in a range of 20:1 to 40:1. The compression ratio is a ratio of a pressure of a last stage of the HPC 24 to a pressure of a first stage of the HPC 24. The compression ratio greater than 20:1 is enabled by the steam system 100, as detailed further below.

The combustion gases 66 are routed into the HPT 28 and expanded through the HPT 28 where a portion of thermal energy and kinetic energy from the combustion gases 66 is extracted via only one stage of HPT stator vanes 68 that are coupled to the outer casing 18 and HPT rotor blades 70 that are coupled to the HP shaft 34, thus, causing the HP shaft 34 to rotate, thereby supporting operation of the HPC 24. The combustion gases 66 are then routed into the LPT 30 and expanded through the LPT 30. Here, a second portion of thermal energy and the kinetic energy is extracted from the combustion gases 66 via sequential stages of LPT stator vanes 72 that are coupled to the outer casing 18 and LPT rotor blades 74 that are coupled to the LP shaft 36, thus, causing the LP shaft 36 to rotate, thereby supporting operation of the LPC 22 and rotation of the fan 38 via the gearbox assembly 46. The HPC 24 having a compression ratio in a range of 20:1 to 40:1 results in the HPT 28 having a pressure expansion ratio in a range of 1.5:1 to 4:1 and the LPT 30 having a pressure expansion ratio in a range of 4.5:1 to 28:1.

The combustion gases 66 are subsequently routed through the one or more core exhaust nozzles 32 of the core turbine engine 16 to provide propulsive thrust. Simultaneously with the flow of the core air 64 through the core air flowpath 33, the bypass air 62 is routed through the bypass airflow passage 56 before being exhausted from a fan bypass nozzle 76 of the turbine engine 10, also providing propulsive thrust. The HPT 28, the LPT 30, and the one or more core exhaust nozzles 32 at least partially define a hot gas path 78 for routing the combustion gases 66 through the core turbine engine 16.

As noted above, the compressed air 65 (the core air 64) is mixed with the fuel 67 in the combustor 26 to form a fuel and air mixture, and combusted, generating combustion gases 66 (combustion products). The fuel 67 can include any type of fuel used for turbine engines, such as, for example, sustainable aviation fuels (SAF) including biofuels, JetA, or other hydrocarbon fuels. The fuel 67 also may be a hydrogen-based fuel ($H_2$), and, while hydrogen-based fuel may include blends with hydrocarbon fuels, the fuel 67 used herein is preferably unblended, and referred to herein as hydrogen fuel. In some embodiments, the hydrogen fuel may comprise substantially pure hydrogen molecules (i.e., diatomic hydrogen). The fuel 67 may also be a cryogenic fuel. For example, when the hydrogen fuel is used, the hydrogen fuel may be stored in a liquid phase at cryogenic temperatures.

The turbine engine 10 includes a fuel system 80 for providing the fuel 67 to the combustor 26. The fuel system 80 includes a fuel tank 82 for storing the fuel 67 therein, and a fuel delivery assembly 84. The fuel tank 82 can be located on an aircraft (not shown) to which the turbine engine 10 is attached. While a single fuel tank 82 is shown in FIG. 1, the fuel system 80 can include any number of fuel tanks 82, as desired. The fuel delivery assembly 84 delivers the fuel 67 from the fuel tank 82 to the combustor 26. The fuel delivery assembly 84 includes one or more lines, conduits, pipes, tubes, etc., configured to carry the fuel 67 from the fuel tank 82 to the combustor 26. The fuel delivery assembly 84 also includes a fuel pump 86 to induce the flow of the fuel 67 through the fuel delivery assembly 84 to the combustor 26. In this way, the fuel pump 86 pumps the fuel 67 from the fuel tank 82, through the fuel delivery assembly 84, and into the combustor 26.

In some embodiments, for example, when the fuel 67 is a hydrogen fuel, the fuel system 80 includes one or more vaporizers 88 (illustrated by dashed lines) and a metering valve 90 (illustrated by dashed lines) in fluid communication with the fuel delivery assembly 84. In this example, the hydrogen fuel is stored in the fuel tank 82 as liquid hydrogen fuel. The one or more vaporizers 88 heat the liquid hydrogen fuel flowing through the fuel delivery assembly 84. The one or more vaporizers 88 are positioned in the flow path of the fuel 67 between the fuel tank 82 and the combustor 26, and are located downstream of the fuel pump 86. The one or more vaporizers 88 are in thermal communication with at least one heat source, such as, for example, waste heat from the turbine engine 10 or from one or more systems of the aircraft (not shown). The one or more vaporizers 88 heat the liquid hydrogen fuel and the liquid hydrogen fuel is converted into a gaseous hydrogen fuel within the one or more vaporizers 88. The fuel delivery assembly 84 directs the gaseous hydrogen fuel into the combustor 26.

The metering valve 90 is positioned downstream of the one or move vaporizers 88 and the fuel pump 86. The metering valve 90 receives hydrogen fuel in a substantially completely gaseous phase, or in a substantially completely supercritical phase. The metering valve 90 provides the flow of fuel to the combustor 26 in a desired manner. More specifically, the metering valve 90 provides a desired volume of hydrogen fuel at, for example, a desired flow rate, to a fuel manifold that includes one or more fuel injectors that inject the hydrogen fuel into the combustor 26. The fuel system 80 can include any components for supplying the fuel 67 from the fuel tank 82 to the combustor 26, as desired.

The turbine engine 10 includes the steam system 100 in fluid communication with the one or more core exhaust nozzles 32 and the fan bypass nozzle 76. The steam system 100 extracts steam from the combustion gases 66 as the combustion gases 66 flow through the steam system 100, as detailed further below.

A controller 96 is in communication with the turbine engine 10 for controlling aspects of the turbine engine 10. For example, the controller 96 is in two-way communication with the turbine engine 10 for receiving signals from various sensors and control systems of the turbine engine 10 and for controlling components of the turbine engine 10, as detailed further below. The controller 96, or components thereof, may be located onboard the turbine engine 10, onboard the aircraft, or can be located remote from each of the turbine engine 10 and the aircraft. The controller 96 can be a Full Authority Digital Engine Control (FADEC) that controls aspects of the turbine engine 10.

The controller 96 may be a standalone controller or may be part of an engine controller to operate various systems of the turbine engine 10. In this embodiment, the controller 96 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 96 to perform operations. The controller 96 and, more specifically, the one or more processors are programmed or configured to perform these operations, such as the operations discussed further below. In some embodiments, the instructions can be executed by the one or more processors to cause the one or more processors to complete any of the operations and functions for which the controller 96 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, or turboprop engines.

Figure 2:
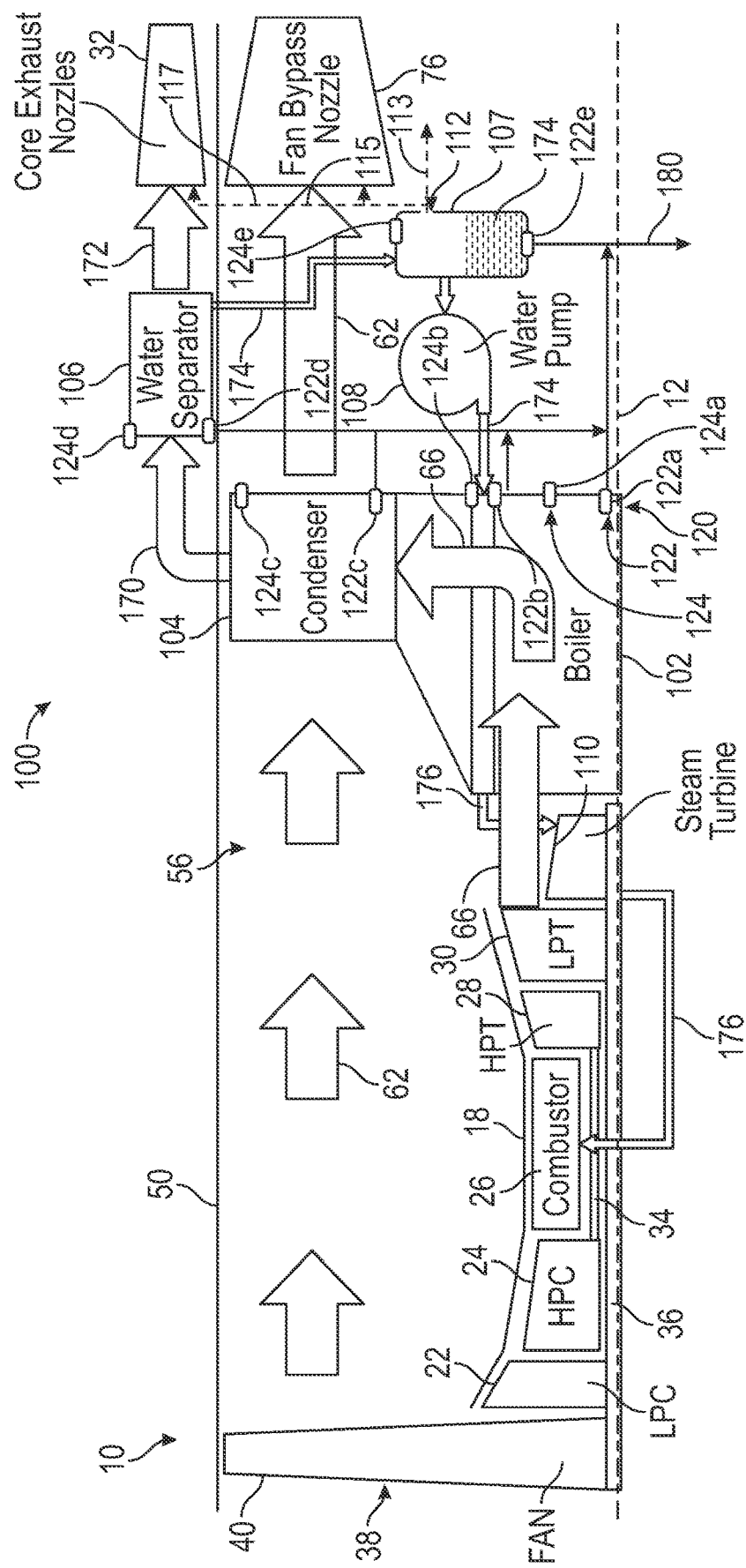
FIG. 2 is a schematic diagram of the turbine engine and the steam system of FIG. 1, according to the present disclosure.

FIG. 2 is a schematic diagram of the turbine engine 10 and the steam system 100 of FIG. 1, according to the present disclosure. For clarity, the turbine engine 10 is shown schematically in FIG. 2 and some components are not shown in FIG. 2. The steam system 100 includes a boiler 102, a condenser 104, a water separator 106, one or more water storage devices 107, a water pump 108, and a steam turbine 110.

The boiler 102 is a heat exchanger that vaporizes liquid water from a water source to generate steam or water vapor, as detailed further below. The boiler 102 is thus a steam source. In particular, the boiler 102 is an exhaust gas-water heat exchanger. The boiler 102 is in fluid communication with the hot gas path 78 (FIG. 1) and is positioned downstream of the LPT 30. The boiler 102 is also in fluid communication with the water pump 108, as detailed further below. The boiler 102 can include any type of boiler or heat exchanger for extracting heat from the combustion gases 66 and vaporizing liquid water into steam or water vapor as the liquid water and the combustion gases 66 flow through the boiler 102.

The condenser 104 is a heat exchanger that further cools the combustion gases 66 as the combustion gases 66 flow through the condenser 104, as detailed further below. In particular, the condenser 104 is an air-exhaust gas heat exchanger. The condenser 104 is in fluid communication with the boiler 102 and is positioned within the bypass airflow passage 56. The condenser 104 can include any type of condenser for condensing water (e.g., in liquid form) from the exhaust (e.g., the combustion gases 66). The condenser 104 can be positioned in the turbine engine 10 in locations other than the bypass airflow passage 56.

The water separator 106 is in fluid communication with the condenser 104 for receiving cooled exhaust (combustion gases 66) having condensed water entrained therein. The water separator 106 is also in fluid communication with the one or more core exhaust nozzles 32 and with the one or more water storage devices 107. The water separator 106 includes any type of water separator for separating water from the exhaust. For example, the water separator 106 can include a cyclonic separator that uses vortex separation to separate the water from the air. In such embodiments, the water separator 106 generates a cyclonic flow within the water separator 106 to separate the water from the cooled exhaust. In FIG. 2, the water separator 106 is schematically depicted as being in the nacelle 50, but the water separator 106 could be located at other locations within the turbine engine 10, such as, for example, radially inward of the nacelle 50, closer to the core turbine engine 16. The water separator 106 may be driven to rotate by one of the core shafts, such as the HP shaft 34 or the LP shaft 36. As noted above, the boiler 102 receives liquid water from a water source to generate steam or water vapor. In the embodiment depicted in FIG. 2, the condenser 104, the water separator 106, or the one or more water storage devices 107, individually or collectively, are the water source for the boiler 102.

The one or more water storage devices 107 are in fluid communication with the water separator 106 and with the water pump 108. The one or more water storage devices 107 are in fluid communication with the condenser 104 via the water separator 106. Each of the one or more water storage devices 107 includes an accumulator tank that accumulates water 174, as detailed further below. Each of the one or more water storage devices 107 includes an overflow drain 112 positioned substantially at a top end of the one or more water storage devices 107. The overflow drain 112 is positioned through the one or more water storage devices 107 such that excess water 174 in the one or more water storage devices 107 drains through the overflow drain 112 and out of the one or more water storage devices 107, as detailed further below. In some embodiments, the overflow drain 112 includes a valve that opens to drain the water 174 through the overflow drain 112 and closes to prevent the water 174 from draining through the overflow drain 112. The valve can be a spring-loaded poppet valve, a check valve, or any other pressure relief valve.

In some embodiments, the one or more water storage devices 107 are arranged in parallel such that each of the one or more water storage devices 107 are separately fluidly coupled with the water pump 108 and the water separator 106. In some embodiments, the one or more water storage devices 107 are arranged in series such that each of the one or more water storage devices 107 is fluidly coupled with each other and the water 174 flows from a respective water storage device 107 to another respective water storage device 107. The one or more water storage devices 107 may be positioned at a bottom end of the turbine engine 10 such that the water 174 flows into, and out of, the one or more water storage devices 107 by gravity. The one or more water storage devices 107 can be positioned in the nacelle 50, inside a tail cone of the turbine engine 10, inside a wing of the aircraft, or within a fuselage of the aircraft. In embodiments in which the one or more water storage devices 107 are positioned above the water separator 106 (e.g., such that the water 174 cannot flow to the one or more water storage devices 107 via gravity), a pump (e.g., a scavenge pump) pumps the water 174 from the water separator 106 to the one or more water storage devices 107.

The water pump 108 is in fluid communication with the one or more water storage devices 107 and with the boiler 102. The water pump 108 is in fluid communication with the water separator 106 via the one or more water storage devices 107 and with the condenser 104 via the water separator 106. The water pump 108 may be any suitable pump, such as a centrifugal pump or a positive displacement pump. The water pump 108 directs the separated liquid water through the boiler 102 where it is converted back to steam. This steam is sent through the steam turbine 110 then injected core air flowpath 33 (FIG. 1), such as into the combustor 26, upstream of the combustor 26, or downstream of the combustor 26.

The steam system 100 also includes a drain system 120 that includes one or more drain valves 122 and one or more vents 124. The boiler 102, the condenser 104, the water separator 106, and the one or more water storage devices 107 each includes one or more of the one or more drain valves 122 and the one or more vents 124. The one or more drain valves 122 allow the water 174 to drain from each of the various components of the steam system 100 and the one or more vents 124 allow air to vent from each of the various components of the steam system 100, as detailed further below. The one or more drain valves 122 include valves that are controlled to be opened to allow the water 174 to drain through the one or more drain valves 122, and to be closed to prevent the water 174 from draining through the one or more drain valves 122. The one or more vents 124 include valves that are controlled to be opened to allow the air to vent through the one or more vents 124, and to be closed to prevent the air from venting through the one or more vents 124.

The boiler 102 includes a first boiler drain valve 122a and a first boiler vent 124a, and a second boiler drain valve 122b and a second boiler vent 124b. The first boiler drain valve 122a and the first boiler vent 124a are in fluid communication with a first boiler flowpath of the boiler 102 (e.g., a flowpath through which the combustion gases 66 flow). The first boiler drain valve 122a is positioned at a bottom end of the first boiler flowpath of the boiler 102, and the first boiler vent 124a is positioned at a top end of the first boiler flowpath of the boiler 102. The second boiler drain valve 122b and the second boiler vent 124b are in fluid communication with a second boiler flowpath of the boiler 102 (e.g., a flowpath through which the water 174 flows). The second boiler drain valve 122b is positioned at a bottom end of the second boiler flowpath of the boiler 102, and the second boiler vent 124b is positioned at a top end of the second boiler flowpath of the boiler 102.

The condenser 104 includes a condenser drain valve 122c and a condenser vent 124c. The condenser drain valve 122c is positioned at a bottom end of the condenser 104, and the condenser vent 124c is positioned at a top end of the condenser 104. The water separator 106 includes a water separator drain valve 122d and a water separator vent 124d. The water separator drain valve 122d is positioned at a bottom end of the water separator 106, and the water separator vent 124d is positioned at a top end of the water separator 106. The one or more water storage devices 107 include a water storage device drain valve 122e and a water storage device vent 124e. The water storage device drain valve 122e is positioned at a bottom end of the one or more water storage devices 107, and the water storage device vent 124e is positioned at a top end of the one or more water storage devices 107.

In operation, the combustion gases 66, also referred to as exhaust, flow from the LPT 30 into the boiler 102. The combustion gases 66 transfer heat into water 174 (e.g., in liquid form) within the boiler 102, as detailed further below. The combustion gases 66 then flow into the condenser 104. The condenser 104 condenses the water 174 (e.g., in liquid form) from the combustion gases 66. The bypass air 62 flows through the bypass airflow passage 56 and over or through the condenser 104 and extracts heat from the combustion gases 66, cooling the combustion gases 66 and condensing the water 174 from the combustion gases 66 to generate an exhaust-water mixture 170. The bypass air 62 is then exhausted out of the turbine engine 10 through the fan bypass nozzle 76 to generate thrust, as detailed above. The condenser 104 thus may be positioned in bypass airflow passage 56.

The exhaust-water mixture 170 flows into the water separator 106. The water separator 106 separates the water 174 from exhaust 172 of the exhaust-water mixture 170 to generate separate the exhaust 172 and the water 174. The exhaust 172 is exhausted out of the turbine engine 10 through the one or more core exhaust nozzles 32 to generate thrust, as detailed above. The boiler 102, the condenser 104, and the water separator 106 thus also define a portion of the hot gas path 78 (FIG. 1) for routing the combustion gases 66, the exhaust-water mixture 170, and the exhaust 172 through the steam system 100 of the turbine engine 10.

The water 174 (e.g., in liquid form) flows from the water separator 106 into the one or more water storage devices 107. The one or more water storage devices 107 store the water 174 therein. When the water 174 fills the one or more water storage devices 107 to the overflow drain 112, excess water 174 drains out of the one or more water storage devices 107 through the overflow drain 112. The overflow drain 112 maintains the water 174 in the one or more water storage devices 107 at a desired maximum water level such that the one or more water storage devices 107 do not overfill with the water 174. The overflow drain 112 can be fluidly coupled to a drain nozzle such that the excess water 174 drains through the drain nozzle and out of the turbine engine 10 (as indicated by arrow 113). Alternatively, or additionally, the overflow drain 112 can be fluidly coupled to the fan bypass nozzle 76 such that the excess water 174 drains from the one or more water storage devices 107 through the fan bypass nozzle 76 and out of the turbine engine 10 (as indicated by arrow 115). Alternatively, or additionally, the overflow drain 112 can be fluidly coupled to the one or more core exhaust nozzles 32 such that the excess water 174 drains from the one or more water storage devices 107 through the one or more core exhaust nozzles 32 and out of the turbine engine 10 (as indicated by arrow 117).

During steady state operating conditions of the turbine engine 10, the steam system 100 produces enough water 174 to generate an amount of the steam 176 for maintaining operation of the turbine engine 10, also referred to as an operating level of the steam 176. In such steady state conditions, the steam system 100 generates an excess amount of the water 174 that fills the one or more water storage devices 107 to the maximum water level and then the water 174 flows through the one or more water storage devices 107 and to the boiler 102. For example, during steady state operating conditions, the input of the water 174 into the one or more water storage devices 107 is greater than the output of the water 174 from the one or more water storage devices 107.

The water pump 108 pumps the water 174 (e.g., in liquid form) from the one or more water storage devices 107 through one or more water lines (as indicated by the arrow for the water 174 in FIG. 2) and the water 174 flows through the boiler 102. As the water 174 flows through the boiler 102, the combustion gases 66 flowing through the boiler 102 transfer heat into the water 174 to vaporize the water 174 and to generate the steam 176 (e.g., vapor). The steam turbine 110 includes one or more stages of steam turbine blades (not shown) and steam turbine stators (not shown). The steam 176 flows from the boiler 102 into the steam turbine 110, through one or more steam lines (as indicated by the arrow for the steam 176 in FIG. 2), causing the steam turbine blades of the steam turbine 110 to rotate, thereby generating additional work in an output shaft (e.g., one of the core shafts) connected to the turbine blades of the steam turbine 110. The steam system 100 may recover up to 70% of the water 174 from the combustion gases 66 and converts the water 174 into the steam 176.

As noted above, the core turbine engine 16 includes shafts, also referred to as core shafts 34, 36, coupling various rotating components of the core turbine engine 16 and other thrust producing components such as the fan 38. In the core turbine engine 16 shown in FIG. 1, these core shafts 34, 36 include the HP shaft 34 and the LP shaft 36. The steam turbine 110 is coupled to one of the core shafts 34, 36 of the core turbine engine 16, such as the HP shaft 34 or the LP shaft 36. In the illustrated embodiment, the steam turbine 110 is coupled to the LP shaft 36. As the steam 176 flows from the boiler 102 through the steam turbine 110, the kinetic energy of this gas is converted by the steam turbine 110 into mechanical work in the LP shaft 36. The reduced temperature steam 176 exiting the steam turbine 110 is then injected into, or upstream of, the combustor 26. The steam 176 injected into the core air flowpath 33 (FIG. 1) (e.g., into, upstream of, or downstream of, the combustor 26) adds mass flow to the core air 64 such that less core air 64 is needed to produce the same amount of work through the turbine section 27. In this way, the steam system 100 extracts additional work in heat in exhaust gas that would otherwise be wasted. The steam 176 injected into the core air flowpath 33 (FIG. 1) is in a range of 20% to 50% of the mass flow through the core air flowpath 33 (FIG. 1).

The steam turbine 110 has a pressure expansion ratio in a range of 2:1 to 6:1. The pressure expansion ratio is a ratio of the pressure at an inlet of the steam turbine 110 to the pressure at an exit of the steam turbine 110. The steam turbine 110 contributes approximately 25% of the power to the LP shaft 36 (or to the HP shaft 34) when the steam system 100 recovers approximately 70% of the water 174 and converts the water 174 into the steam 176. The steam turbine 110 has a pressure expansion ratio in a range of 2:1 to 6:1, the LPT 30 has a pressure expansion ratio in a range of 4.5:1 to 28:1, and the steam 176 contributes to 20% to 50% of the mass flow through the core air flowpath 33 (FIG. 1). The steam turbine 110 expands the steam 176, thereby reducing the energy of the steam 176 and reducing the temperature of the steam 176 to approximately a temperature of the compressed air 65 (FIG. 1) that is discharged from the HPC 24. Such a configuration enables the steam 176 to reduce hot spots in the combustor 26 from the combustion of the fuel (e.g., in particular when the fuel is supercritical hydrogen or gaseous hydrogen).

The additional work that is extracted by the steam system 100 and the steam 176 injected into the core air flowpath 33 enables a size of the core turbine engine 16 (FIG. 1) to be reduced, thereby increasing the bypass ratio of the turbine engine 10, as compared to turbine engines without the benefit of the present disclosure. In this way, the turbine engine 10 has a bypass ratio greater than 18:1, preferably, in a range of 18:1 to 100:1. In this way, the steam system 100 can enable an increased bypass ratio in which the turbine engine 10 can move a larger mass of air through the bypass, reducing the pressure ratio of the fan 38 and increasing the efficiency of the turbine engine 10 as compared to turbine engines without the benefit of the present disclosure.

The steam 176 injected into the core air flowpath 33 also enables the HPT 28 to have a greater energy output with fewer stages of the HPT 28 as compared to HPTs without the benefit of the present disclosure. For example, the additional mass flow from the steam 176 through the turbine section 27 helps to produce a greater energy output. In this way, the HPT 28 may only have one stage capable of sustainably driving a higher number of stages of the HPC 24 (e.g., 10, 11, or 12 stages of the HPC 24) due to the higher mass flow (resulting from the steam injection) exiting the combustor 26. The steam 176 that is injected into the core air flowpath 33 enables the HPT 28 to have only one stage that drives the plurality of stages of the HPC 24 without reducing an amount of work that the HPT 28 produces as compared to HPTs without the benefit of the present disclosure, while also reducing a weight of the HPT 28 and increasing an efficiency of the HPT 28, as compared to HPTs without the benefit of the present disclosure.

With less core air 64 needed due to the added mass flow from the steam 176, the compression ratio of the HPC 24 may be increased as compared to HPCs without the benefit of the present disclosure. In this way, the HPC 24 has a compression ratio greater than 20:1. In some embodiments, the compression ratio of the HPC 24 is in a range of 20:1 to 40:1. Thus, the compression ratio of the HPC 24 is increased, thereby increasing the thermal efficiency of the turbine engine 10 as compared to HPCs and turbine engines without the benefit of the present disclosure. Further, the HPC 24 may have a reduced throat area due to the added mass flow in the core turbine engine 16 provided by the steam 176 injected into the core turbine engine 16. Accordingly, the HPC 24 has a reduced size (e.g., outer diameter) and a reduced weight, as compared to turbine engines without the benefit of the present disclosure.

In some embodiments, the HPC stator vanes of at least two stages of the HPC 24 are variable stator vanes that are controlled to be pitched about a pitch axis to vary a pitch of the HPC stator vanes. In some embodiments, the HPC 24 includes one or more compressor bleed valves that are controlled to be opened to bleed a portion of the compressed air 65 from the HPC 24. The one or more compressor bleed valves are preferably positioned between a fourth stage of the HPC 24 and a last stage of the HPC 24. The HPC stator vanes that are variable stator vanes, and the one or more compressor bleed valves, help to balance the air flow (e.g., the compressed air 65) through all stages of the HPC 24. Such a balance, in combination with the steam 176 injected into the core air flowpath 33 to flow through the core air flowpath 33, enables the number of stages of the HPC 24 to include ten to twelve stages for compression ratios to be greater than 20:1, and preferably in a range of 20:1 to 40:1.

During transient operating conditions of the turbine engine 10, the steam system 100 may not be able to extract enough water 174 from the combustion gases 66 to maintain the operating level of the steam 176 that is injected into the core air flowpath 33. During such transient operating conditions, the input of the water 174 into the one or more water storage devices 107 is less than the output of the water 174 from the one or more water storage devices 107. Accordingly, the steam system 100 supplies the water 174 that has accumulated in the one or more water storage devices 107 to the boiler 102 during transient conditions such that the water 174 drains from water storage device 107. In this way, the level of the water 174 in the one or more water storage devices 107 decreases during the transient operating conditions.

Accordingly, the one or more water storage devices 107 include two states including a first state and a second state. The first state occurs when the one or more water storage devices 107 are being filled with the water 174 or maintains a level of the water 174 in the one or more water storage devices 107. For example, the first state occurs during steady state operation of the turbine engine 10 when the steam system 100 is able to extract a first amount of the water 174 that is an equal amount or a greater amount of the water 174 than is necessary for generating the operating level of the steam 176. The second state occurs when the water 174 in the one or more water storage devices 107 drains from the one or more water storage devices 107 such that the level of the water 174 in the one or more water storage devices 107 decreases. For example, the second state occurs during transient operation conditions of the turbine engine 10 when the steam system 100 is unable to extract the equal amount or greater amount of the water 174 necessary for generating the operating level of the steam 176. In this way, the second state occurs when the steam system 100 extracts a second amount of the water 174 that is a lesser amount of the water 174 than is necessary for generating the operating level of the steam 176. In some embodiments, the water storage device 107 is filled with the water 174 on the ground prior to the turbine engine 10 powering on (e.g., by a human). In some embodiments, the water storage device 107 is primed with the water 174 prior to initiating injection of the steam 176. In some embodiments, the water storage device 107 collects the water 174 while the turbine engine 10 is operating at idle conditions.

In certain conditions, when the turbine engine 10 is not operating (e.g., the turbine engine 10 is shut down), the water 174 in the steam system 100 can freeze. For example, when the turbine engine 10 is shut down and the temperature is below freezing (e.g., less than 0° C.), the water 174 in the steam system 100 can freeze. To prevent the water 174 from freezing in the steam system 100, the drain system 120 opens to drain the water 174 from the steam system 100. Each of the one or more drain valves 122 opens when the turbine engine 10 is shut down such that the water 174 drains from the steam system 100 and out of the turbine engine 10 (as indicated by arrow 180). For example, the first boiler drain valve 122a and the second boiler drain valve 122b open to drain the water 174 from the boiler 102, the condenser drain valve 122c opens to drain the water 174 from the condenser 104, the water separator drain valve 122d opens to drain the water 174 from the water separator 106, and the water storage device drain valve 122e opens to drain the water 174 from the water storage device 107. At the same time, the one or more vents 124 open to vent air within the steam system 100 to prevent a vacuum within the steam system 100 as the water 174 is draining. For example, the first boiler vent 124a and the second boiler vent 124b open to vent the boiler 102, the condenser vent 124c opens to vent the condenser 104, the water separator vent 124d opens to vent the water separator 106, and the water storage device vent 124e opens to vent the water storage device 107.

The one or more drain valves 122 and the one or more vents 124 are opened automatically when the turbine engine 10 shuts down. For example, the controller 96 (FIG. 1) controls the one or more drain valves 122 to open the one or more drain valves 122 and controls the one or more vents 124 to open the one or more vents 124 when the turbine engine 10 is shut down. In some embodiments, the one or more drain valves 122 and the one or more vents 124 open when the controller 96 is de-energized (e.g., the controller 96 is not receiving power), and the one or more drain valves 122 and the one or more vents 124 close when the controller 96 is energized (e.g., the controller 96 receives power). In some embodiments, the controller 96 determines the turbine engine 10 is in a shutdown, and opens the one or more drain valves 122 and the one or more vents 124 upon determining the turbine engine 10 is in the shutdown. The one or more drain valves 122 and the one or more vents 124 can be opened and closed individually such that only certain ones of the one or more drain valves 122 and the one or more vents 124 are opened during the shutdown.

Figure 3:
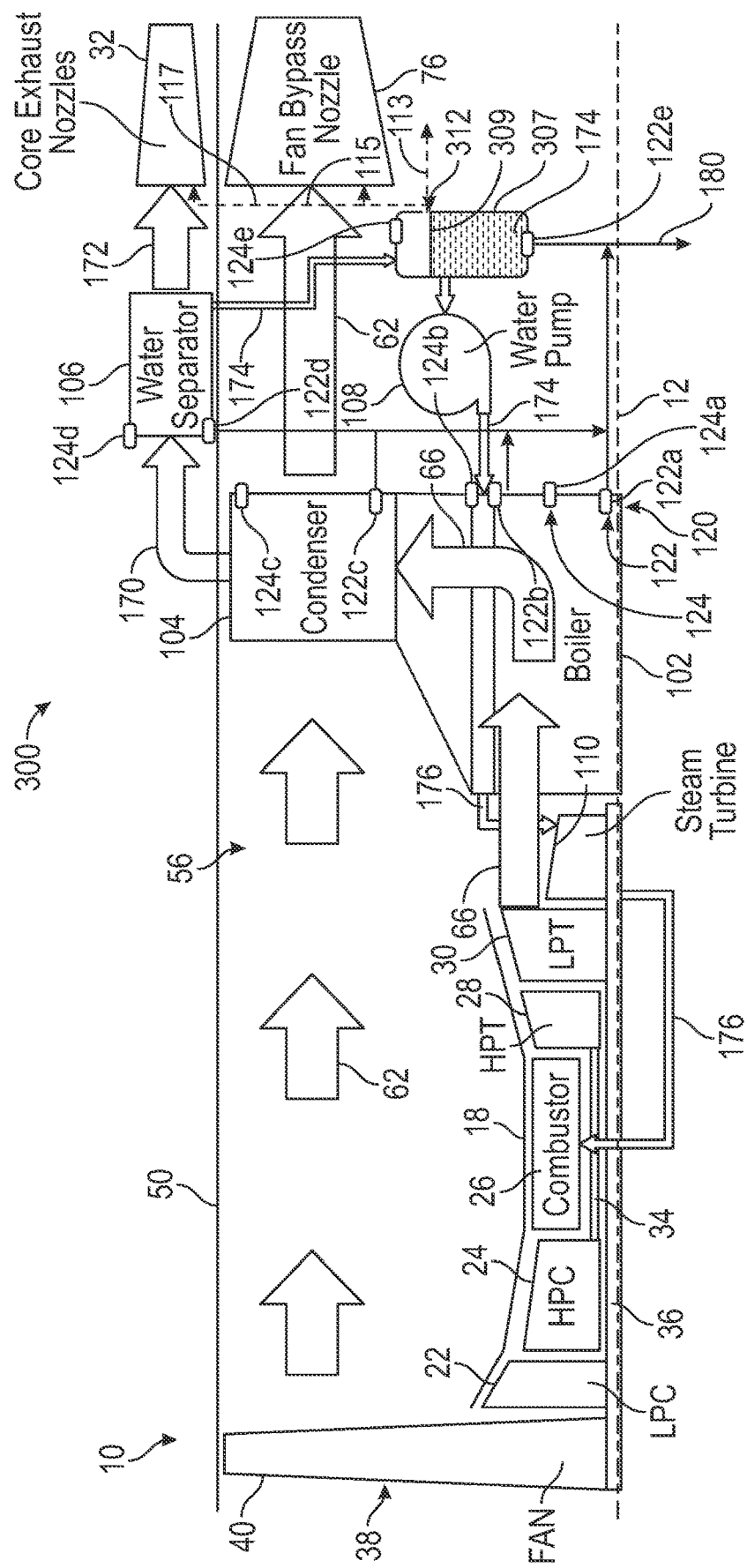
FIG. 3 is a schematic diagram of the turbine engine and a steam system, according to another embodiment.

FIG. 3 is a schematic diagram of the turbine engine 10 and a steam system 300, according to another embodiment. The steam system 300 is substantially similar to the steam system 100 of FIG. 2 and includes many of the same or similar components and operates substantially similar as the steam system 100. The steam system 300 includes one or more water storage devices 307 that are different than the one or more water storage devices 107 of FIG. 2. The one or more water storage devices 307 include a variable volume that is adjusted by an adjustable diaphragm 309. The water 174 in the one or more water storage devices 307 fills to the adjustable diaphragm 309. In this way, a level (e.g., a volume) of the water 174 in the one or more water storage devices 307 is based on a position of the adjustable diaphragm 309 in the one or more water storage devices 307. The adjustable diaphragm 309 can move up or move down within the one or more water storage devices 307 to change the level (e.g., the volume) of the water 174 in the one or more water storage devices 307. For example, the controller 96 (FIG. 1) controls the adjustable diaphragm 309 to move up or to move down to adjust the level of the water 174 in the one or more water storage devices 307. In some embodiments, the adjustable diaphragm 309 moves up or moves down by a pressure within the one or more water storage devices 307 such that the one or more water storage devices 307 are passively pressurized. The adjustable diaphragm 309 pressurizes the one or more water storage devices 307 to reduce or to minimize fluctuations in the pressure of the water 174 in the steam system 300. The one or more water storage devices 307 also includes an overflow drain 312 to maintain the level of the water 174 in the one or more water storage devices 307 at the maximum water level during steady state operating conditions (e.g., when the input of the water is greater than the output of the water).

Accordingly, the steam systems 100 (FIG. 1), 300 (FIG. 3) detailed herein provide for supplying the water 174 to the boiler 102 even during transient operating conditions when the steam systems 100, 300 may not be able to extract enough water 174 to generate the operating level of the steam 176. In this way, the steam systems 100, 300 produce the operating level of the steam 176 during all operating conditions of the turbine engine 10, i.e., during both steady state operating conditions and transient operating conditions without significantly increasing the overall weight of the turbine engine 10 (e.g., by adding a large water storage tank). The drain system 120 ensures the water 174 in the steam systems 100, 300 does not freeze when the turbine engine 10 is shut down. Further, the additional work that is extracted by the steam system 100 and the steam 176 that is expanded through the steam turbine 110 and is injected into the core air flowpath 33 enables the turbine engine 10 to have a bypass ratio greater than 18:1 (e.g., preferably in a range of 18:1 to 100:1), enables the HPT 28 to have only one stage that drives a plurality of stages of the HPC 24, and enables the HPC 24 to have a compression ratio greater than 20:1 (e.g., preferably in a range of 20:1 to 40:1).

Further aspects of the present disclosure are provided by the subject matter of the following clauses.

A turbine engine for an aircraft. The turbine engine comprises a fan shaft coupled to a fan, a combustor positioned in a core air flowpath that combusts compressed air and fuel to generate combustion gases, a core shaft, a turbine positioned downstream of the combustor to receive the combustion gases and to rotate the turbine, the turbine being drivingly coupled to the core shaft to rotate the core shaft when the turbine rotates, wherein rotation of the core shaft causes the fan shaft to rotate, and a steam system that extracts water from the combustion gases, vaporizes the water to generate steam, and injects the steam into the core air flowpath, the steam system comprising one or more water storage devices that store the water therein prior to the water vaporizing to generate the steam, the one or more water storage devices including a first state in which the one or more water storage devices increase or maintain a level of the water in the one or more water storage devices as the water flows through the one or more water storage devices, and a second state in which the one or more water storage devices decrease the level of the water in the one or more water storage devices as the water flows through the one or more water storage devices.

The turbine engine of the preceding clause, the first state of the one or more water storage devices being during steady state operating conditions of the turbine engine.

The turbine engine of any preceding clause, the second state of the one or more water storage devices being during transient operating conditions of the turbine engine.

The turbine engine of any preceding clause, the one or more water storage devices including an overflow drain such that the water fills to the overflow drain and drains from the one or more water storage devices through the overflow drain to maintain the level of the water at a maximum water level during the first state of the one or more water storage devices.

The turbine engine of any preceding clause, the steam system further comprising one or more drain valves that open during a shutdown of the turbine engine to drain the water from the steam system during the shutdown.

The turbine engine of any preceding clause, the steam system further comprising one or more vents that open during the shutdown of the turbine engine to vent the steam system as the water drains through the one or more drain valves during the shutdown.

The turbine engine of any preceding clause, the steam system comprising a condenser that condenses the water from the combustion gases and a boiler that vaporizes the water to generate the steam, the water flowing from the condenser to the one or more water storage devices and from the one or more water storage devices to the boiler.

The turbine engine of any preceding clause, the boiler being in fluid communication with the core air flowpath such that the combustion gases flow through the boiler and vaporize the water to generate the steam.

The turbine engine of any preceding clause, further comprising a bypass airflow passage, bypass air flowing through the bypass airflow passage and core air flows through the core air flowpath, the condenser being positioned downstream of the boiler and in the bypass airflow passage for the bypass air to cool the combustion gases and to condense the water from the combustion gases.

The turbine engine of any preceding clause, the one or more water storage devices being positioned downstream of the condenser to receive the water from the condenser and to supply the water to the boiler.

The turbine engine of any preceding clause, the steam system further comprising a steam turbine that receives the steam to rotate the steam turbine, the steam turbine being drivingly coupled to the core shaft to rotate the core shaft when the steam turbine rotates.

The turbine engine of any preceding clause, the steam turbine receiving the steam from the boiler.

The turbine engine of any preceding clause, the condenser receiving the combustion gases from the boiler.

The turbine engine of any preceding clause, further comprising a water separator positioned downstream of the condenser, the water separator separating the water from the cooled combustion gases.

The turbine engine of the preceding clause, the water separator being a cyclonic separator.

The turbine engine of any preceding clause, the one or more water storage devices being fluidly coupled to the water separator.

The turbine engine of any preceding clause, further comprising a water pump in fluid communication with the one or more water storage devices and with the boiler to induce the flow of the water from the one or more water storage devices to the boiler.

The turbine engine of any preceding clause, further comprising a fan comprising a plurality of fan blades that rotates to generate a volume of air.

The turbine engine of any preceding clause, the core shaft being a low-pressure shaft and being coupled to the fan.

The turbine engine of any preceding clause, the further comprising a low-pressure turbine coupled to the low-pressure shaft such that rotation of the low-pressure turbine rotates the low-pressure shaft.

The turbine engine of any preceding clause, further comprising a low-pressure compressor coupled to the low-pressure shaft to be driven by the low-pressure turbine and the steam turbine.

The turbine engine of any preceding clause, further comprising a high-pressure turbine coupled to a high-pressure shaft, and a high-pressure compressor drivingly coupled to the high-pressure shaft such that rotation of the high-pressure turbine rotates the high-pressure compressor.

The turbine engine of any preceding clause, the high-pressure compressor having a compression ratio of greater than 20:1, or in a range of 20:1 to 40:1.

The turbine engine of any preceding clause, a bypass ratio of the bypass air to the core air being greater than 18:1, or in a range of 18:1 to 100:1.

The turbine engine of any preceding clause, the one or more drain valves including a first boiler drain valve in fluid communication with a first boiler flowpath of the boiler and a second boiler drain valve in fluid communication with a second boiler flowpath of the boiler.

The turbine engine of any preceding clause, the one or more drain valves including a condenser drain valve in fluid communication with the condenser.

The turbine engine of any preceding clause, the one or more drain valves including a water separator drain valve in fluid communication with the water separator.

The turbine engine of any preceding clause, the one or more drain valves including a water storage device drain valve in fluid communication with the one or more water storage devices.

The turbine engine of any preceding clause, the one or more vents including a first boiler vent in fluid communication with the first boiler flowpath of the boiler and a second boiler vent in fluid communication with the second boiler flowpath of the boiler.

The turbine engine of any preceding clause, the one or more vents including a condenser vent in fluid communication with the condenser.

The turbine engine of any preceding clause, the one or more vents including a water separator vent in fluid communication with the water separator.

The turbine engine of any preceding clause, the one or more vents including a water storage device vent in fluid communication with the one or more water storage devices.

The turbine engine of any preceding clause, further comprising a fan bypass nozzle such that the bypass air flows out of the turbine engine through the fan bypass nozzle.

The turbine engine of any preceding clause, the overflow drain in fluid communication with the fan bypass nozzle such that the water drains from the one or more water storage devices through the fan bypass nozzle and out of the turbine engine.

The turbine engine of any preceding clause, further comprising one or more core exhaust nozzles such that the combustion gases exhaust out of the turbine engine through the one or more core exhaust nozzles.

The turbine engine of any preceding clause, the overflow drain in fluid communication with the one or more core exhaust nozzles such that the combustion gases exhaust out of the turbine engine through the one or more core exhaust nozzles.

The turbine engine of any preceding clause, the one or more water storage devices including an adjustable diaphragm that moves up or moves down to adjust the maximum water level.

The turbine engine of any preceding clause, further comprising a controller in communication with the turbine engine.

The turbine engine of any preceding clause, the controller controlling the one or more drain valves to open and to close the one or more drain valves.

The turbine engine of any preceding clause, the controller controlling the one or more vents to open and to close the one or more vents.

The turbine engine of any preceding clause, the controller controlling the adjustable diaphragm to move the adjustable diaphragm up or down in the water storage device to adjust the maximum water level.

The turbine engine of any preceding clause, the one or more water storage devices being arranged in parallel.

The turbine engine of any preceding clause, the one or more water storage devices being arranged in series.

The turbine engine of any preceding clause, the one or more water storage devices being positioned at a bottom end of the turbine engine.

The turbine engine of any preceding clause, the one or more water storage devices being positioned in a nacelle of the turbine engine.

The turbine engine of any preceding clause, the one or more water storage devices being positioned at a tail cone of the turbine engine.

The turbine engine of any preceding clause, the turbine engine being coupled to an aircraft, and the one or more water storage devices being positioned in a wing of the aircraft.

The turbine engine of any preceding clause, the one or more water storage devices being passively pressurized.

A method of operating the turbine engine of any preceding clause, the method comprising extracting, with the steam system, a first amount of the water from the combustion gases, supplying, with the steam system, the first amount of the water to the one or more water storage devices and supplying the water from the one or more water storage devices to generate the steam and to increase or to maintain the level of the water in the one or more water storage devices during the first state of the one or more water storage devices as the water flows from the one or more water storage devices, and extracting, with the steam system, a second amount of the water from the combustion gases, the second amount of the water being less than the first amount of the water, and supplying, with the steam system, the second amount of the water to the one or more water storage devices and supplying the water from the one or more water storage devices to generate the steam and to decrease the level of the water in the one or more water storage devices during the second state of the one or more water storage devices as the water flows from the one or more water storage devices.

The method of any preceding clause, the one or more water storage devices including an overflow drain, and the method further comprises supplying the first amount of the water to the one or more water storage devices to fill the one or more water storage devices with the water, and draining the water from the one or more water storage devices through the overflow drain to maintain the level of the water at a maximum water level during the first state of the one or more water storage devices.

The method of any preceding clause, the first state of the one or more water storage devices being during steady state operating conditions of the turbine engine.

The method of any preceding clause, the first amount of the water input into the one or more water storage devices being greater than an amount of the water output from the one or more water storage devices during the steady state operating conditions.

The method of any preceding clause, the second state of the one or more water storage devices being during transient operating conditions of the turbine engine.

The method of any preceding clause, the second amount of water input into the one or more water storage devices being less than an amount of water output from the one or more water storage devices during transient operating conditions.

The method of any preceding clause, the steam system further comprising one or more drain valves, and the method further comprises opening the one or more drain valves during a shutdown of the turbine engine to drain the water from the steam system during the shutdown.

The method of any preceding clause, the steam system further comprising one or more vents, and the method further comprises opening the one or more vents during the shutdown of the turbine engine to vent the steam system as the water drains through the one or more drain valves during the shutdown.

The method of any preceding clause, the steam system comprising a condenser and a boiler, the one or more water storage devices being in fluid communication with the condenser and the boiler, and the method further comprises condensing the water from the combustion gases in the condenser, supplying the water from the condenser to the one or more water storage devices to fill the one or more water storage devices with the water, supplying the water from the one or more water storage devices to the boiler, and vaporizing the water to generate the steam in the boiler.

The method of any preceding clause, the boiler being in fluid communication with the core air flowpath, and the method further comprises directing the combustion gases through the boiler to vaporize the water to generate the steam.

The method of any preceding clause, the turbine engine further comprising a bypass airflow passage, bypass air flowing through the bypass airflow passage and core air flowing through the core air flowpath, the condenser being positioned downstream of the boiler and in the bypass airflow passage for the bypass air to cool the combustion gases and to condense the water from the combustion gases.

The method of any preceding clause, the steam system further comprising a steam turbine that is drivingly coupled to the core shaft, the method further comprising supplying the steam to the steam turbine to rotate the steam turbine.

The method of any preceding clause, further comprising supplying steam from the boiler to the steam turbine.

The method of any preceding clause, further comprising supplying the combustion gases from the boiler to the condenser.

The method of any preceding clause, the steam system further comprising a water separator positioned downstream of the condenser, the method further comprising separating the water from the cooled combustion gases in the water separator.

The method of the preceding clause, the water separator being a cyclonic separator.

The method of any preceding clause, the water storage device being fluidly coupled to the water separator.

The method of any preceding clause, further comprising a water pump in fluid communication with the one or more water storage devices and with the boiler to induce the flow of the water from the one or more water storage devices to the boiler.

The method of any preceding clause, further comprising a fan comprising a plurality of fan blades that rotates to generate a volume of air.

The method of any preceding clause, the core shaft being a low-pressure shaft and being coupled to the fan.

The method of any preceding clause, further comprising a low-pressure turbine coupled to the low-pressure shaft such that rotation of the low-pressure turbine rotates the low-pressure shaft.

The method of any preceding clause, further comprising a low-pressure compressor coupled to the low-pressure shaft to be driven by the low-pressure turbine and the steam turbine.

The method of any preceding clause, further comprising a high-pressure turbine coupled to a high-pressure shaft, and a high-pressure compressor drivingly coupled to the high-pressure shaft such that rotation of the high-pressure turbine rotates the high-pressure compressor.

The method of any preceding clause, the high-pressure compressor having a compression ratio of greater than 20:1, or in a range of 20:1 to 40:1.

The method of any preceding clause, a bypass ratio of the bypass air to the core air being greater than 18:1, or in a range of 18:1 to 100:1.

The method of any preceding clause, the one or more drain valves including a first boiler drain valve in fluid communication with a first boiler flowpath of the boiler and a second boiler drain valve in fluid communication with a second boiler flowpath of the boiler.

The method of any preceding clause, the one or more drain valves including a condenser drain valve in fluid communication with the condenser.

The method of any preceding clause, the one or more drain valves including a water separator drain valve in fluid communication with the water separator.

The method of any preceding clause, the one or more drain valves including a water storage device drain valve in fluid communication with the one or more water storage devices.

The method of any preceding clause, the one or more vents including a first boiler vent in fluid communication with the first boiler flowpath of the boiler and a second boiler vent in fluid communication with the second boiler flowpath of the boiler.

The method of any preceding clause, the one or more vents including a condenser vent in fluid communication with the condenser.

The method of any preceding clause, the one or more vents including a water separator vent in fluid communication with the water separator.

The method of any preceding clause, the one or more vents including a water storage device vent in fluid communication with the one or more water storage devices.

The method of any preceding clause, further comprising a fan bypass nozzle such that the bypass air flows out of the turbine engine through the fan bypass nozzle.

The method of any preceding clause, the overflow drain in fluid communication with the fan bypass nozzle, the method further comprising draining the water from the one or more water storage devices through the fan bypass nozzle and out of the turbine engine.

The method of any preceding clause, further comprising one or more core exhaust nozzles, the method further comprising exhausting the combustion gases out of the turbine engine through the one or more core exhaust nozzles.

The method of any preceding clause, the overflow drain in fluid communication with the one or more core exhaust nozzles, the method further comprising exhausting the combustion gases out of the turbine engine through the one or more core exhaust nozzles.

The method of any preceding clause, the one or more water storage devices including an adjustable diaphragm, the method further comprising moving up or moving down the adjustable diaphragm in the one or more water storage devices to adjust the maximum water level.

The method of any preceding clause, the turbine engine further comprising a controller in communication with the turbine engine.

The method of any preceding clause, further comprising controlling, with the controller, the one or more drain valves to open and to close the one or more drain valves.

The method of any preceding clause, further comprising controlling, with the controller, the one or more vents to open and to close the one or more vents.

The method of any preceding clause, further comprising controlling, with the controller, the adjustable diaphragm to move the adjustable diaphragm up or down in the water storage device to adjust the maximum water level.

The method of any preceding clause, the one or more water storage devices being arranged in parallel.

The method of any preceding clause, the one or more water storage devices being arranged in series.

The method of any preceding clause, the one or more water storage devices being positioned at a bottom end of the turbine engine.

The method of any preceding clause, the one or more water storage devices being positioned in a nacelle of the turbine engine.

The method of any preceding clause, the one or more water storage devices being positioned at a tail cone of the turbine engine.

The method of any preceding clause, the turbine engine being coupled to an aircraft, and the one or more water storage devices being positioned in a wing of the aircraft.

The method of any preceding clause, the one or more water storage devices being passively pressurized.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A turbine engine for an aircraft, the turbine engine comprising:
   a fan shaft coupled to a fan;
   a combustor positioned in a core air flowpath that combusts compressed air and fuel to generate combustion gases;
   a core shaft;
   a turbine positioned downstream of the combustor to receive the combustion gases and to rotate the turbine, the turbine being drivingly coupled to the core shaft to rotate the core shaft when the turbine rotates, wherein rotation of the core shaft causes the fan shaft to rotate; and
   a steam system that extracts water from the combustion gases, vaporizes the water to generate steam with a boiler, and injects the steam into the core air flowpath, the steam system comprising:
      one or more water storage devices that store the water therein prior to the water vaporizing to generate the steam, the one or more water storage devices including an overflow drain fluidly coupled to at least one of a drain nozzle, a fan bypass nozzle, or one or more core exhaust nozzles, wherein the one or more water storage devices include a first state in which the water flows through the overflow drain and the at least one of the drain nozzle, the fan bypass nozzle, or the one or more core exhaust nozzles out of the turbine engine to increase or maintain a level of the water in the one or more water storage devices at a maximum water level as the water flows through the one or more water storage devices, and a second state in which an input of the water into the one or more water storage devices is less than an output of the water from the one or more water storage devices to the boiler such that the water is prevented from flowing through the overflow drain and the one or more water storage devices decrease the level of the water in the one or more water storage devices as the water flows through the one or more water storage devices to the boiler.

2. The turbine engine of claim 1, wherein the first state of the one or more water storage devices is during steady state operating conditions of the turbine engine.

3. The turbine engine of claim 1, wherein the second state of the one or more water storage devices is during transient operating conditions of the turbine engine.

4. The turbine engine of claim 1, wherein the steam system further comprises one or more drain valves that open during a shutdown of the turbine engine to drain the water from the steam system during the shutdown.

5. The turbine engine of claim 4, wherein the steam system further comprises one or more vents that open during the shutdown of the turbine engine to vent the steam system as the water drains through the one or more drain valves during the shutdown.

6. The turbine engine of claim 1, wherein the steam system comprises a condenser that condenses the water from the combustion gases and the boiler that vaporizes the water to generate the steam, the water flowing from the condenser to the one or more water storage devices and from the one or more water storage devices to the boiler.

7. The turbine engine of claim 6, wherein the boiler is in fluid communication with the core air flowpath such that the combustion gases flow through the boiler and vaporize the water to generate the steam.

8. The turbine engine of claim 6, further comprising a bypass airflow passage, wherein bypass air flows through the bypass airflow passage and core air flows through the core air flowpath, the condenser being positioned downstream of the boiler and in the bypass airflow passage for the bypass air to cool the combustion gases and to condense the water from the combustion gases.

9. The turbine engine of claim 8, wherein the one or more water storage devices are positioned downstream of the condenser to receive the water from the condenser and to supply the water to the boiler.

10. A method of operating the turbine engine of claim 1, the method comprising:
   extracting, with the steam system, a first amount of the water from the combustion gases;
   supplying, with the steam system, the first amount of the water to the one or more water storage devices and supplying the water from the one or more water storage devices to the boiler to generate the steam and to increase or to maintain the level of the water in the one or more water storage devices during the first state of the one or more water storage devices as the water flows from the one or more water storage devices; and
   extracting, with the steam system, a second amount of the water from the combustion gases, the second amount of the water being less than the first amount of the water; and
   supplying, with the steam system, the second amount of the water to the one or more water storage devices and supplying the water from the one or more water storage devices to generate the steam and to decrease the level of the water in the one or more water storage devices such that the input of the water into the one or more water storage devices is less than the output of the water from the one or more water storage devices to the boiler during the second state of the one or more water storage devices as the water flows from the one or more water storage devices.

11. The method of claim 10, wherein the one or more water storage devices include an overflow drain, and the method further comprises:
   supplying the first amount of the water to the one or more water storage devices to fill the one or more water storage devices with the water; and
   draining the water from the one or more water storage devices through the overflow drain to maintain the level of the water at a maximum water level during the first state of the one or more water storage devices.

12. The method of claim 10, wherein the first state of the one or more water storage devices is during steady state operating conditions of the turbine engine.

13. The method of claim 12, wherein the first amount of the water input into the one or more water storage devices is greater than an amount of the water output from the one or more water storage devices during the steady state operating conditions.

14. The method of claim 10, wherein the second state of the one or more water storage devices is during transient operating conditions of the turbine engine.

15. The method of claim 14, wherein the second amount of water input into the one or more water storage devices is less than an amount of water output from the one or more water storage devices during transient operating conditions.

16. The method of claim 10, wherein the steam system further comprises one or more drain valves, and the method further comprises opening the one or more drain valves during a shutdown of the turbine engine to drain the water from the steam system during the shutdown.

17. The method of claim 16, wherein the steam system further comprises one or more vents, and the method further comprises opening the one or more vents during the shutdown of the turbine engine to vent the steam system as the water drains through the one or more drain valves during the shutdown.

18. The method of claim 10, wherein the steam system comprises a condenser, the one or more water storage devices being in fluid communication with the condenser and the boiler, and the method further comprises:
   condensing the water from the combustion gases in the condenser;
   supplying the water from the condenser to the one or more water storage devices to fill the one or more water storage devices with the water;
   supplying the water from the one or more water storage devices to the boiler; and
   vaporizing the water to generate the steam in the boiler.

19. The method of claim 18, wherein the boiler is in fluid communication with the core air flowpath, and the method further comprises directing the combustion gases through the boiler to vaporize the water to generate the steam.

20. The turbine engine of claim 1, the steam system further comprising a steam turbine that receives the steam to rotate the steam turbine, the steam turbine being drivingly coupled to the core shaft to rotate the core shaft when the steam turbine rotates.

* * * * *